United States Patent [19]

Armbruster

[11] Patent Number: 4,722,991

[45] Date of Patent: Feb. 2, 1988

[54] PHENOL-FORMALDEHYDE-FURFURYL ALCOHOL RESINS

[75] Inventor: David R. Armbruster, Forest Park, Ill.

[73] Assignee: Acme Resin Corporation, Westchester, Ill.

[21] Appl. No.: 866,439

[22] Filed: May 23, 1986

[51] Int. Cl.[4] .......................... C08G 8/04; C08G 8/06; C08G 8/30

[52] U.S. Cl. .................................... 528/139; 525/508; 528/127; 528/129; 528/140; 528/157; 528/158; 528/159; 528/164

[58] Field of Search ................ 525/508; 528/140, 139, 528/129, 159, 157, 158, 164, 127

[56] References Cited

U.S. PATENT DOCUMENTS

| | | | |
|---|---|---|---|
| 3,312,650 | 4/1967 | Case et al. | 528/129 X |
| 3,549,584 | 12/1970 | Sekera | 524/442 X |
| 3,847,860 | 11/1974 | Seller et al. | 528/164 X |
| 4,051,301 | 9/1977 | Laitar | 528/129 X |
| 4,053,447 | 10/1977 | Shea | 528/157 X |
| 4,108,808 | 8/1978 | Narayan et al. | 528/159 X |
| 4,108,809 | 8/1978 | Narayan et al. | 528/159 X |
| 4,187,368 | 2/1980 | Bekbulatov et al. | 528/139 X |
| 4,255,554 | 3/1981 | Wuskell | 528/139 X |
| 4,311,619 | 1/1982 | Seeney et al. | 528/164 X |
| 4,403,046 | 9/1983 | Anderson et al. | 528/127 X |

*Primary Examiner*—Howard E. Schain

[57] ABSTRACT

A terpolymer is prepared from phenol, furfuryl alcohol and formaldehyde wherein a substantial amount of the furfuryl alcohol is catalytically reacted by means of a water soluble multivalent metal salt catalyst, and wherein the reaction is carried out under essentially hydrous conditions.

15 Claims, No Drawings

PHENOL-FORMALDEHYDE-FURFURYL ALCOHOL RESINS

BACKGROUND OF THE INVENTION

1. Field of the Invention

The present invention relates to phenolformaldehyde-furfuryl alcohol resins which are useful as foundry binder compositions, and as laminating, coating and bonding resins.

2. Description of the Prior Art

Phenol-formaldehyde-furfuryl alcohol resins are known to have been prepared in a process using an acid catalyst to catalyze the reaction of furfuryl alcohol with phenol and formaldehyde.

U.S. Pat. No. 4,255,544 to Wuskell discloses a process for preparing a terpolymer of phenol, furfuryl alcohol and formaldehyde by reacting these monomers under anhydrous conditions in an organic medium using a multivalent metallic salt catalyst which is soluble in the organic medium. The water of condensation formed from the reaction mixture is continuously removed by means of azeotropic distillation.

SUMMARY OF THE INVENTION

The present invention relates to a terpolymer prepared from phenol, furfuryl alcohol and formaldehyde wherein a substantial amount of the furfuryl alcohol is catalytically reacted by means of a water soluble multivalent metal salt catalyst, and wherein the reaction is carried out under essentially hydrous conditions.

DESCRIPTION OF THE PREFERRED EMBODIMENT

In accordance with the present invention, a phenol-formaldehyde-furfuryl alcohol terpolymer is prepared from the catalytic reaction of phenol, formaldehyde and furfuryl alcohol, wherein the catalyst is a water soluble multivalent metal salt, and wherein the reaction is carried out under essentially hydrous conditions.

The common water soluble salts of multivalent metal ions which can be used as the catalyst in the present invention are less costly than the organic solvent soluble salts at equal equivalents of metal ion that are used in the process disclosed in U.S. Pat. No. 4,255,554 to Wuskell.

The use of a water soluble multivalent metal salt eliminates the necessity for controlling the reaction pH in the manner necessary with an acid catalyst. However, the multivalent metal salt catalyzed reaction must be operated at a pH of less than 7.0. When uncontaminated phenol, formalin, furfuryl alcohol and zinc or lead acetate are mixed in the proper proportions, the pH is always less than 7.0.

Thus, in the present invention, organic solvents are not needed to remove water, nor is an azeotropic distillation and the equipment normally associated with this type of distillation necessary. Moreover, an aqueous solution of formaldehyde, such as formalin can be used in place of paraformaldehyde, the solid low molecular weight polymer of formaldehyde. Liquid formalin is also easier to handle and less costly than paraformaldehyde.

The water soluble multivalent metal salts used as the catalysts in the present invention include the multivalent ions of manganese, zinc, cadmium, magnesium, cobalt, nickel, tin, copper, iron, lead, and calcium. Preferred catalysts are zinc acetate or lead acetate, and mixtures thereof.

The terpolymer reaction can be carried out by initially reacting furfuryl alcohol and formaldehyde at temperatures of about 85° to 105° C., at atmospheric pressure, then adding phenol and continuing the reaction to a viscosity of about 100 to 10,000, preferably about 200 to 5,000 centipoises, measured at a temperature of about 25° C.

The maximum reaction temperature is determined by the boiling point of the reaction mixture at atmospheric pressure. However, the reaction can be conducted at elevated temperatures of up to about 140° C. in pressurized reaction vessels, taking care to ensure that the reaction mixture does not boil under these elevated conditions.

The reaction can also be carried out by initially reacting phenol and formaldehyde, then adding the furfuryl alcohol and continuing the reaction to a viscosity of about 100 to 10,000 cps, preferably about 200 to 5,000 cps, measured at about 25° C. Alternatively, the reaction can be carried out by reacting phenol, furfuryl alcohol and formaldehyde simultaneously in the presence of the water soluble multivalent metal salt catalysts.

The ratio of unreacted furfuryl alcohol to phenol in the final product is dependent upon the initial ratios of furfuryl alcohol to phenol, as well as the reaction method used, and this ratio can be monitored by analysis. The preferred ratio would also be influenced by the end use of the product.

It is generally desirable to remove excess water from the reaction products by distillation. The excess water is above the amount necessary to solubilize the multivalent metal salt catalyst. Excess water can be present in the formalin and also formed from the condensation reaction. Its removal can be accomplished conveniently during the reaction at any point which facilitates processing of the product. An important constraint upon the amount of water removed during the reaction is that sufficient water be present to maintain enough multivalent metal salt catalyst in aqueous solution to catalyze the reaction. Therefore, it is desirable that enough water be present to maintain substantially all of the water soluble multivalent metal salt catalyst in aqueou solution.

As already noted, the end point of the reaction can be controlled by reacting to a viscosity specification of about 100 to 10,000 centipoises at about 25° C. The resu ting phenol-formaldehyde-furfuryl alcohol terpolymer can be used as is or diluted with any suitable solvent, including furfuryl alcohol or water.

The ratios of phenol, furfuryl alcohol, and formaldehyde can vary widely with respect to each other, depending upon economic considerations and performance requirements. Since furfuryl alcohol is more costly than phenol, the more phenol and less furfuryl alcohol that can be used with acceptable performance, will reduce the cost of the resin. However, the higher the furfuryl alcohol content of the cured resin, the better the resin's resistance will be to many chemicals, particularly caustic solutions. Moreover, when the resins are cured in end use applications employing an acid catalyst, resins with higher amounts of furfuryl alcohol will be more reactive.

In general, the mole ratio of phenol to furfuryl alcohol can vary from about 0.1:1 to about 10:1, respectively. The mole ratio of formaldehyde to phenol+furfuryl alcohol can vary from about 0.5:1 to 2:1, respectively in moles of CH$_2$O:phenol+furfuryl alcohol. The amount of catalyst can vary from about 0.2% to about 8% by weight of the total amount of phenol and furfuryl alcohol.

Although the reaction has been described in terms of formaldehyde, other aldehydes of the general formula: R—CHO can also be used, wherein R is a hydrocarbon radical containing about 1-8 carbon atoms such as acetaldehyde, propionaldehyde, furfuraldehyde, and the like. The preferred form of formaldehyde is in the hydrous state, such as formalin.

Furfuryl alcohol or substituted furfuryl alcohol compounds can be used with the formula:

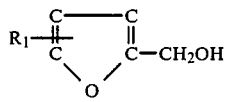

where R$_1$ can be an alkyl, aryl, alkenyl, alkylol, alkoxy, aryloxy, halogen or hydroxy radical. The preferred compound is furfuryl alcohol.

In addition, although phenol is the preferred phenolic reactant, other substituted phenols can also be used, especially those phenols having the formula:

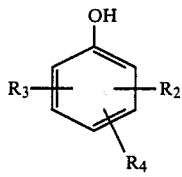

wherein R$_2$, R$_3$ and R$_4$ can independently be hydrogen, hydrocarbon radicals, oxyhydrocarbon radicals, hydroxy radicals or halogen, and substituted such that either the two ortho, one ortho and the para, or the two ortho and the para positions are unsubstituted. In general, the phenols that can be used are those which are suitable for making phenolic resins. Some examples are o-cresol, m-cresol, p-cresol, octyl phenol, nonyl phenol, 3,5-dimethoxy phenol, p-tert-butylphenol, p-butoxyphenol, resorcinol, 3,5-xylenol, 3-5-diethylphenol, catechol, 3,5-dibutylphenol and the like.

The examples which follow serve to illustrate the present invention, and all parts and percentages are by weight unless otherwise indicated.

EXAMPLE 1

Into a 5 liter three necked flask equipped with a stirrer, thermometer and reflux condenser were charged 1000 grams of furfuryl alcohol, 1000 grams of 50% formalin and 48 grams of 25% zinc acetate solution in water. The flask was then heated until the contents reached a temperature of 97° C. This temperature was held for 3 hours and 15 minutes at which time a sample was taken from the flask. This sample was checked for formaldehyde content and found to contain 22.0% formaldehyde which corresponds to 50 grams of formaldehyde being consumed in the reaction. At 3 hours and 50 minutes of total reaction time the batch was cooled to about 50° C. by vacuum dehydration and dehydrated to remove 452 grams of distillate. 1000 grams of phenol was then added to the flask and the batch heated to reaction temperature. The temperature was 99° C. at the start of the reaction with phenol present and dropped to 97° C. after 6 hours and 35 minutes of reaction time. The batch was then cooled with cooling water to give a final product with the following properties: Viscosity: 726 centipoise at 25° C.; unreacted formaldehyde: 1.6%; unreacted furfuryl alcohol: 1.6%; unreacted phenol: 18.1%; refractive index: 1.533 at 25° C.

EXAMPLE 2

Into a 5 liter three necked flask equipped with a stirrer, thermometer and reflux condenser were charged 1000 grams of phenol, 1150 grams of 50% formalin and 48 grams of 25% zinc acetate solution in water. The flask was heated and the batch reached a temperature of 99° C. and was reacted for 4 hours and 15 minutes. During this reaction the batch temperature gradually fell from 99° C. to 96° C. At this time the batch was cooled with cooling water and a sample checked for formaldehyde content which was 9.0% formaldehyde corresponding to 377 grams of formaldehyde being reacted with the phenol. The batch was then vacuum dehydrated at about 50° C. to remove 558 grams of distillate. 1015 grams of furfuryl alcohol was then added to flask and the reaction continued for 5 hours and 40 minutes at about 97° C. The batch was then cooled to give a product with the following properties: Viscosity: 1,650 centipoise at 25° C.; unreacted phenol: 6.7%; unreacted furfuryl alcohol: 11.0%

EXAMPLE 3

Into a 5 liter three necked flask equipped with a stirrer, thermometer and reflux condenser were charged 1000 grams of phenol, 1150 grams of 50% formalin and 41 grams of lead acetate Pb(CH$_3$COO)$_2$.3H$_2$O. The batch was reacted for 4 hours and 15 minutes, during which time the temperature varied from 100° to 104° C. The batch was then cooled by vacuum dehydration and checked for unreacted formaldehyde which was 2.8% by weight. An additional 200 grams of 50% formalin was added to the batch and approximately 660 grams of distillate was removed by vacuum dehydration at approximately 50° C. 1015 grams of furfuryl alcohol was then added and the batch reacted for 3 hours and 15 minutes at approximately 100° C. At this time the reaction mixture was cooled by applying cooling water to the flask. The reaction product had a viscosity of 2680 centipoise at 25° C. 80 grams of water was added to reduce the viscosity to 1,910 centipoise at 25° C. The final product contained 1.0% unreacted formaldehyde, 4.9% unreacted phenol and 12.1% unreacted furfuryl alcohol.

EXAMPLE 4

Into a 5 liter three necked flask equipped with a stirrer, thermometer and reflux condenser were charged 1200 grams of phenol, 1200 grams of 50% formalin and 60 grams of 25% zinc acetate solution in water. The flask was then heated and the batch reacted for 4 hours at 97° to 100° C. At this time the batch was cooled with cooling water and a sample checked for formaldehyde content and found to be 6.45%. The batch was then vacuum dehydrated at about 50° to remove 549 grams of distillate. 800 grams of furfuryl alcohol was added to the flask and the reaction continued for 3 hours and 16 minutes at 90° to 101° C. The batch was then cooled to give a product with the following properties:

| | |
|---|---|
| Viscosity | 1,231 cps at 25° C. |
| Unreacted Formaldehyde | 1.8% |
| Unreacted Phenol | 8.6% |
| Unreacted furfuryl alcohol | 7.8% |

What is claimed is:

1. A process for preparing furfuryl alcoholphenolic aldehyde terpolymers comprising:
   reacting under hydrous conditions:
   (a) an aldehyde of the formula R—CHO, wherein R is hydrogen or a hydrocarbon radical containing about one to eight carbon atoms;
   (b) a furfuryl alcohol or substituted furfuryl alcohol compound having the formula:

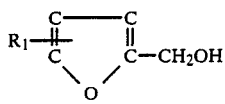

where $R_1$ can be an alkyl, aryl, alkenyl, alkylol, alkoxy, aryloxy, halogen or hydroxy radical, and mixtures thereof; and
   (c) a phenolic compound, having the formula:

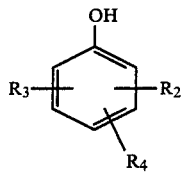

wherein $R_2$, $R_3$ and $R_4$ can independently be hydrogen, a hydrocarbon radical, an oxyhydrocarbon radical, hydroxy radical and halogen, and substituted such that either the two ortho, one ortho and the para, or the two ortho and the para positions are unsubstituted; said reaction being conducted in the presence of a catalytic amount of a water soluble multivalent metal salt at pH less than 7.0; and wherein a sufficient amount of catalyst is present in aqueous solution to adequately catalyze said reaction.

2. The process of claim 1, wherein said catalyst is selected from the group consisting of zinc acetate, lead acetate, and mixtures thereof.

3. The process of claim 1, wherein said aldehyde is formaldehyde.

4. The process of claim 3, wherein said formaldehyde is formalin.

5. The process of claim 1, wherein the mole ratio of phenolic compound to furfuryl alcohol varies from about 0.1:1 to about 10:1 respectively.

6. The process of claim 1, wherein the mole ratio of aldehyde to phenolic compound+furfuryl alcohol varies from about 0.5:1 to 2:1, respectively.

7. The process of claim 1, wherein the amount of catalyst varies from about 0.2 to 8.0% by weight of the total amount of phenolic compound and furfuryl alcohol.

8. The process of claim 1, wherein said phenolic compound is selected from the group consisting of phenol, cresols, xylenol, octyl phenol, nonyl phenol, p-tert-butyl phenol, resorcinol, catechol and mixtures thereof.

9. The process of claim 8, wherein said phenolic compound is phenol.

10. The process of claim 1, wherein the metal moiety of the water soluble multivalent metal salt is selected from the group consisting of Mn, Zn, Cd, Mg, Co, Ni, Fe, Pb, Ca, Cu, Sn, and mixtures thereof.

11. The process of claim 1, wherein the reaction temperature varies from about 85° C. to 105° C.

12. The process of claim 1, wherein the reaction is carried out at elevated pressure sufficient to prevent the reaction mixture from boiling at a reaction temperature of about 105° C. to 140° C.

13. A process for preparing furfuryl alcoholphenolic aldehyde terpolymers comprising:
   reacting under hydrous conditions, furfuryl alcohol, formaldehyde and phenol;
   said reaction being conducted in the presence of a catalytic amount of a water soluble multivalent metal salt at pH less than 7.0 wherein the metal is selected from the group consisting of Mn, Zn, Cd, Mg, Co, Ni, Fe, Pb, Ca, Cu, Sn, and mixtures thereof; and wherein a sufficient amount of catalyst is present in aqueous solution to adequately catalyze said reaction.

14. The process of claim 13, wherein the reaction temperature varies from about 85° C. to 105° C.

15. The process of claim 13, wherein the reaction is carried out at elevated pressure sufficient to prevent the reaction mixture from boiling at a reaction temperature of about 105° C. to 140° C.

* * * * *